US012663861B2

(12) United States Patent
Maric et al.

(10) Patent No.: US 12,663,861 B2
(45) Date of Patent: Jun. 23, 2026

(54) EYE-TRACKING ASSEMBLY

(71) Applicant: Apple Inc., Cupertino, CA (US)

(72) Inventors: Ivan S. Maric, Campbell, CA (US);
Eric Shyr, San Francisco, CA (US);
James W. Sallay, Seattle, WA (US);
Aidan N. Zimmerman, Poway, CA
(US); Shaw Chien Wu, Campbell, CA
(US); Keenan Molner, San Francisco,
CA (US)

(73) Assignee: APPLE INC., Cupertino, CA (US)

( * ) Notice: Subject to any disclaimer, the term of this
patent is extended or adjusted under 35
U.S.C. 154(b) by 0 days.

(21) Appl. No.: 19/042,631

(22) Filed: Jan. 31, 2025

(65) Prior Publication Data

US 2025/0383708 A1      Dec. 18, 2025

Related U.S. Application Data

(60) Provisional application No. 63/659,197, filed on Jun.
12, 2024.

(51) Int. Cl.
| | |
|---|---|
| *G09G 5/00* | (2006.01) |
| *G02B 27/00* | (2006.01) |
| *G02B 27/01* | (2006.01) |
| *G06F 3/01* | (2006.01) |
| *H05B 45/00* | (2022.01) |
| *H05B 47/195* | (2020.01) |

(52) U.S. Cl.
CPC ......... *G06F 3/013* (2013.01); *G02B 27/0093*
(2013.01); *G02B 27/0101* (2013.01); *G02B*
*27/017* (2013.01); *H05B 45/00* (2020.01);
*H05B 47/195* (2020.01); *G02B 2027/0138*
(2013.01)

(58) Field of Classification Search
CPC .......... G06F 3/13; H05B 45/00; H05B 47/195
USPC .............................................. 345/8
See application file for complete search history.

(56) References Cited

U.S. PATENT DOCUMENTS

| | | | | |
|---|---|---|---|---|
| 2007/0246717 A1* | 10/2007 | Ng | ...................... | H10H 20/8506 |
| | | | | 257/E33.073 |
| 2018/0129135 A1* | 5/2018 | Sakai | ...................... | G03F 7/032 |
| 2018/0219125 A1* | 8/2018 | Wicke | .................. | H10H 20/857 |
| 2023/0204198 A1* | 6/2023 | Pfeffer | .................. | H04N 23/56 |
| | | | | 362/227 |
| 2023/0314797 A1* | 10/2023 | Kearns | ............... | G02B 27/0093 |
| | | | | 359/630 |
| 2024/0069347 A1* | 2/2024 | Rong | .................. | G02B 27/0172 |
| 2024/0094809 A1* | 3/2024 | Zhang | .................. | G06V 10/145 |
| 2024/0175976 A1* | 5/2024 | Veenstra | ................ | G01S 7/027 |

* cited by examiner

Primary Examiner — Jonathan M Blancha
(74) *Attorney, Agent, or Firm* — Dorsey & Whitney LLP

(57) ABSTRACT

A head-mountable electronic device includes an optical
module frame, a display coupled to the optical module frame
and extending in a display plane, and an eye-tracking
assembly. The eye-tracking assembly includes a flat electri-
cal cable, for example a flexible printed circuit (FPC),
coupled to the optical module frame and disposed about a
perimeter of the display, and a light emitting diode (LED)
electrically coupled to the flat electrical cable and configured
to direct light away from the display. The flat electrical cable
defines a major plane oriented generally orthogonal to the
display.

19 Claims, 5 Drawing Sheets

EYE-TRACKING ASSEMBLY

CROSS-REFERENCE TO RELATED APPLICATION(S)

This application claims the benefit of U.S. Provisional Patent Application No. 63/659,197, filed 12 Jun. 2024, and entitled "EYE-TRACKING ASSEMBLY," the entire disclosure of which is hereby incorporated by reference.

FIELD

The described examples relate generally to head-mountable electronic devices. More particularly, the present examples relate to optical modules for head-mountable electronic devices.

BACKGROUND

Recent advances in portable computing have enabled head-mountable devices that provide augmented reality and virtual reality (AR/VR) experiences to users. Such head-mountable devices can include various components such as a display, a viewing frame, lenses, optical components, a battery, motors, speakers, sensors, cameras, and other components. These components can operate together to provide an immersive user experience.

Head-mountable devices include optical modules for displaying graphical representations to a user through screens and receiving eye-tracking inputs via eye-tracking components. These eye-tracking components may be visible and distracting if disposed within the viewing field of the user. In addition, manufacturing such optical modules can be complicated and expensive. Thus, the manufacturing of optical modules is subject to electrical, compliance, reflectance, cosmetic, and optical requirements. Installation of various components are often done in clean rooms to protect against dust and other contaminants, leading to complicated assembly and high cost. Therefore, there is a need for simpler and cheaper methods of manufacturing optical modules and head-mountable devices that do not visually distract from the AR/VR experience during use.

SUMMARY

In at least one example of the present disclosure, a head mountable electronic device includes an optical module frame, a display coupled to the optical module frame and extending in a display plane, and an eye-tracking assembly. The eye-tracking assembly includes an electrical flex coupled to the optical module frame and disposed about a perimeter of the display. The electrical flex defines a major plane oriented generally orthogonal to the display plane. The eye-tracking assembly further includes a light emitting diode (LED) electrically coupled to the electrical flex and configured to direct light away from the display.

In one example of the head-mountable electronic device, the electrical flex comprises a flat electronic cable having a height and a width at least five times greater than the height. In one example of the head-mountable electronic device, the width extends in the major plane. In one example of the head-mountable electronic device, the LED is a side-firing LED. In one example of the head-mountable electronic device, the LED has a black housing. In one example of the head-mountable electronic device, the LED is coupled to the electrical flex via a black solder. In one example of the head-mountable electronic device, the head-mountable electronic device further includes a bezel secured to the optical module frame. The electrical flex can be secured to the bezel. In one further example of the head-mountable electronic device, the bezel and the optical module frame define a cavity between the display and a lens secured to the optical module frame. The electrical flex is disposed within the cavity. In one further example of the head-mountable electronic device, the bezel and the optical module frame define a cavity between the display and a lens secured to the optical module frame. The bezel can be disposed between the electrical flex and the cavity. In a further example of the head-mountable electronic device, the bezel includes an infrared (IR) window and the LED is positioned to direct the light through the IR window.

In at least one example of the present disclosure, an optical module for a wearable electronic device includes an optical module frame, a display coupled to the optical module frame and extending in a display plane, a bezel coupled to the optical module frame, a seal disposed between the bezel and the optical module frame and an eye-tracking assembly. The eye-tracking assembly includes a flexible printed circuit (FPC) coupled to the bezel and positioned radially outward from a perimeter of the display. The FPC defines a major plane oriented non-parallel to the display plane. The eye-tracking module further includes a light emitting diode (LED) electrically coupled to the FPC.

In one example of the optical module, the FPC extends through the seal. In one example of the optical module, the seal is over molded with the bezel. In one example of the optical module, the seal includes silicone. In one example of the optical module, the major plane is oriented generally orthogonal to the display plane.

In at least one example of the present disclosure, an eye-tracking assembly for a head-mountable display device includes an FPC defining a major plane and coupled to a display assembly of the head-mountable display device, the display assembly including a display coupled to a frame. The eye-tracking assembly further includes a light emitting diode (LED) array. Each LED of the LED array is electrically coupled to the FPC and oriented to project light parallel to the major plane.

In one example of the eye-tracking assembly, each LED of the LED array is coupled to the FPC via black solder. In one example of the eye-tracking assembly, an LED of the LED array includes a height extending orthogonal to the FPC and a width greater than the height. The width extends parallel to the major plane. In one example, the eye-tracking assembly further includes a camera secured to the frame and oriented away from the display. In a further example of the eye-tracking assembly, the camera is electrically coupled to the FPC.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
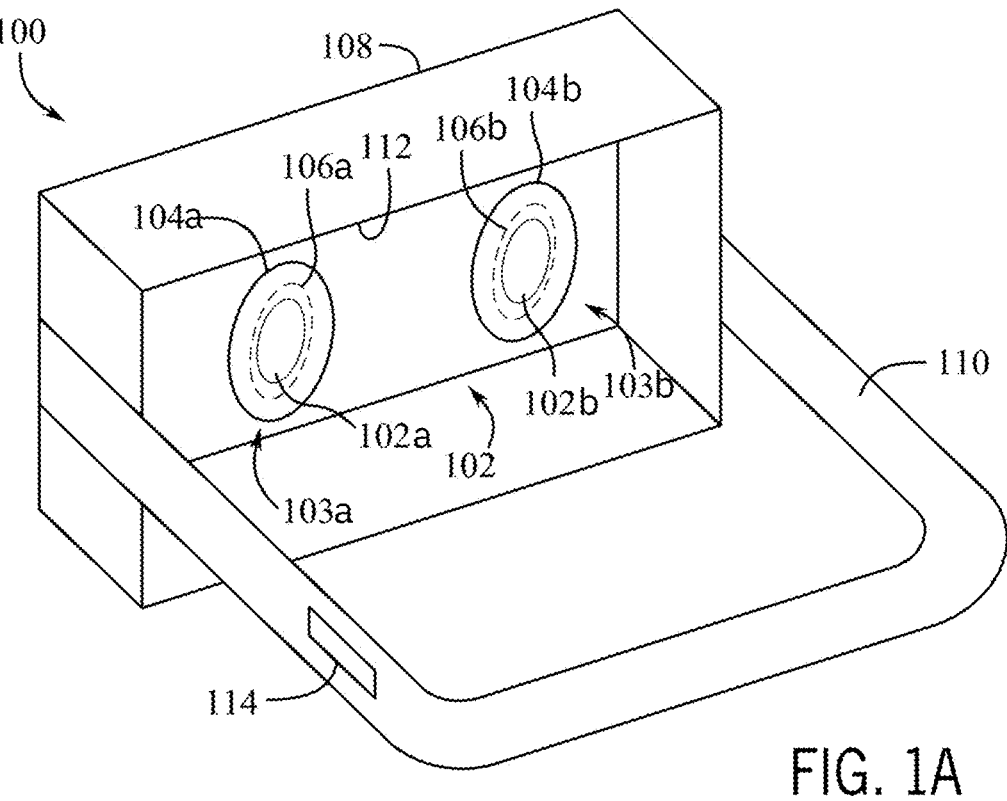
FIG. 1A illustrates a perspective view of an example of a head-mountable electronic device.

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples as defined by the appended claims.

The following disclosure relates to a head-mountable electronic device. More particularly, the following disclosure relates to eye-tracking optical modules of head-mountable electronic devices. In at least one example, a head-mountable device can include a viewing frame and a securement arm (or strap/band) extending from the viewing frame. Examples of head-mountable electronic devices can include virtual reality or augmented reality (VR/AR) devices that include an optical module. In the case of augmented reality devices, optical eyeglasses or frames can be worn on the head of a user such that optical windows, which can include transparent windows, lenses, or displays, can be positioned in front of the user's eyes. In another example, a virtual reality device can be worn on the head of a user such that a display is positioned in front of the user's eyes. The viewing frame can include a housing (e.g., a display housing or housing) or other structural components supporting the optical components, for example, lenses or display windows, or various electronic components.

Additionally, a head-mountable electronic device can include one or more electronic components used to operate the head-mountable electronic device. These components can include any components used by the head-mountable electronic device to produce a virtual or augmented reality experience. For example, electronic components can include one or more projectors, waveguides, speakers, processors, batteries, circuitry components including wires and circuit boards, or any other electronic components used in the head-mountable device to deliver augmented or virtual reality visuals, sounds, and other outputs. The various electronic components can be disposed within the electronic component housing. In some examples, the various electronic components can be disposed with in or attached to one or more of the housing, the electronic component housing, or the securement arm.

One input method for a head-mountable electronic device includes eye-tracking. The following disclosure relates to an optical module which includes an eye-tracking assembly having a flat electrical cable, for example a flexible printed circuit (FPC) or other flat electrical flex, disposed around a perimeter of a display of the optical module and oriented such that a major plane of the flat electrical cable is orthogonal, or substantially orthogonal, to a display of the optical module. The orthogonality of the electrical cable relative to the display minimizes a visual footprint of the eye-tracking assembly when the user is watching images projected from the display.

In addition, methods for manufacturing optical modules can allow some components to be assembled upstream rather than in a clean room, for example, the eye-tracking assembly coupled to the bezel of the optical module enclosure, which is simpler and more cost effective. Along these lines, optical modules described herein can include an optical enclosure component having a bezel. The electrical flex can be wrapped around the inside of the bezel and integrated with the display and can include side-firing light emitting diodes (LEDs). Side-firing LEDs have a slimmer profile compared to front-firing LEDs which decrease the visual footprint of the eye-tracking assembly within the optical module, thus allowing for a slimmer and lighter weight head-mountable electronic device. Additionally, the slim profile of side-firing LEDs allow them to be relatively hidden by the bezel.

These and other examples are discussed below with reference to FIGS. 1-5. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1B:
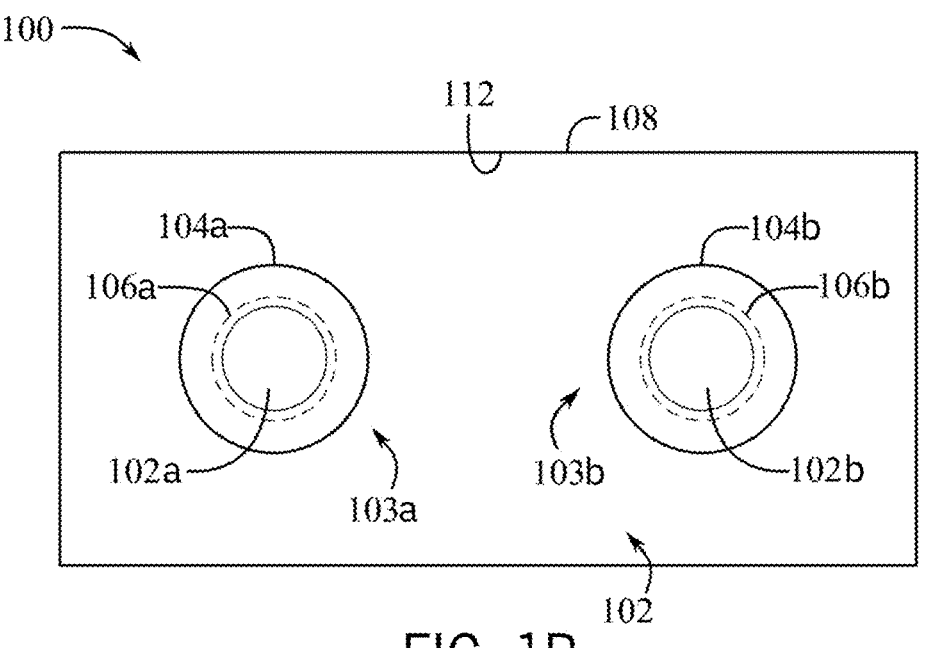
FIG. 1B illustrates a rear view of the head-mountable electronic device.

FIG. 1A illustrates a perspective view of a head-mountable electronic device 100, in accordance with one or more examples of the present disclosure. FIG. 1B illustrates a rear view of the head-mountable electronic device 100. As used herein, a rear view refers to a view as would be seen by a user when the head-mountable device is donned on the user's head. A head-mountable electronic device can include a head-mountable device having one or more displays and configured to display content to a user. Head mountable display devices can include AR/VR goggles, head-sets, as well as smart glasses, smart goggles, or any other wearable, head mountable devices configured to display content, either virtually or through augmented reality, to a user donning the device.

The head-mountable electronic device 100 illustrated in FIG. 1 can include a display assembly 102 including one or more displays 102a, 102b, or other optical component (e.g., one or transparent windows, optical lenses, or display screens disposed in front of the eyes of the user) of respective optical modules 103a, 103b. The displays 102a-b can be coupled to a frame, such as respective optical module frames 104a, 104b. In some examples, the head-mountable device 100 can include two displays 102a, 102b corresponding to each of the user's eyes. The first and second displays 102a-b can be part of the display or display assembly 102. In one example, the displays 102a-b can include display screens, for example, pixelated display screens, configured to project light toward the user's eyes.

The displays 102a-b can be part of respective optical modules 103a-b including respective optical module frames 104a-b, which can include sensors, cameras, LEDs, an optical housing, a cover glass, sensitive optical elements, and so forth. The displays 102*a-b* can be coupled to the optical module frames 104*a-b* and can extend in a plane referred to as a display plane. In one example, the display plane can be substantially coplanar with the viewing plane of the rear view of the head-mountable electronic device 100 illustrated in FIG. 1B. In at least one example, electrical flexes 106*a*, 106*b* can be coupled to the optical module frames 104*a-b*, respectively. The electrical flexes 106*a-b* can include flexible printed circuits and can also be referred to as a flat electrical cable or an illumination flex. In at least one example, electrical cables and flexes referred to and described herein can include one or more flexible printed circuits (FPC) including flat FPCs. As will be further described with respect to FIGS. 2A-2C, the electrical flexes 106*a-b* can be disposed about a perimeter of the respective displays 102*a-b*.

The head-mountable electronic device 100 can include a housing 108 disposed around the display assembly 102. The display assembly 102 can be disposed on or within the housing 108. The housing 108 can include a frame securing the optical modules 103*a-b* in place. In one example, the housing 108 can include a material component defining an external surface of the device 100. In one example, the head-mountable electronic device 100 can include a secure-ment strap 110. The strap 110 can be configured to secure the head-mountable electronic device 100 to the user's head. The strap 110 can be connected to the housing 108. The strap 110 can be configured to secure the display assembly 102 in a position relative to the user head such that the display assembly 102 is positioned in front of the user's eyes. In one example, the strap 110 can extend behind the user's head. In other examples, the strap 110 can extend over the top of the user's head. In one example, the device 100 can include more than one strap 110, including two straps or arms pressing against the sides of a user's head, as in the case of smart glasses devices. The arms can rest on the user's ears. In some cases, the arms can apply opposing pressures to the sides of the user's head to secure the head-mountable electronic device 100 to the user's head via friction. In some examples, the head-mountable device can include the strap 110 and arms.

The head-mountable electronic device 100 can include a facial interface 112, such as a light seal or other foam or soft feature extending about a perimeter and an inner surface of the housing 108. As used herein, the term "facial interface" refers to a portion of the head-mountable electronic device 100 that engages a user face via direct contact. For example, the facial interface can be connected to the housing 108 (display housing). In one example, the facial interface 112 includes portions of the head-mountable electronic device 100 that conform to (e.g., compress against) regions of a user face. For example, a facial interface 112 can include a pliant (or semi-pliant) face track that spans the forehead region, wraps around the eyes, contacts the zygoma region and maxilla region of the face, and bridges the nose. As used herein, the term "forehead region" can include an area of a human face between the eyes and the scalp of a human. Additionally, the term "zygoma region" can include an area of a human face corresponding to the zygomatic bone structure of a human. Similarly, the term "maxilla region" can include an area of a human face corresponding to the maxilla bone structure of a human.

The head-mountable electronic device 100 can include an electronics pod 114. The electronics pod 114 can be disposed on or within the strap 110. In other examples, the electronics pod 114 can be disposed on the strap 110, the housing 108, or elsewhere on the head-mountable electronic device 100. The electronics pod 114 can include various electronic components, such a controllers, microcontrollers, proces-sors, memory, batteries, power port(s), projectors, wave-guides, and the like.

Any of the features, components, and/or parts, including the arrangements and configurations thereof shown in FIGS. 1A-1B can be included, either alone or in any combination, in any of the other examples of devices, features, compo-nents, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 1A-1B Additional details of eye-tracking cameras are described below with reference to FIGS. 2A-2D.

Figure 2A:
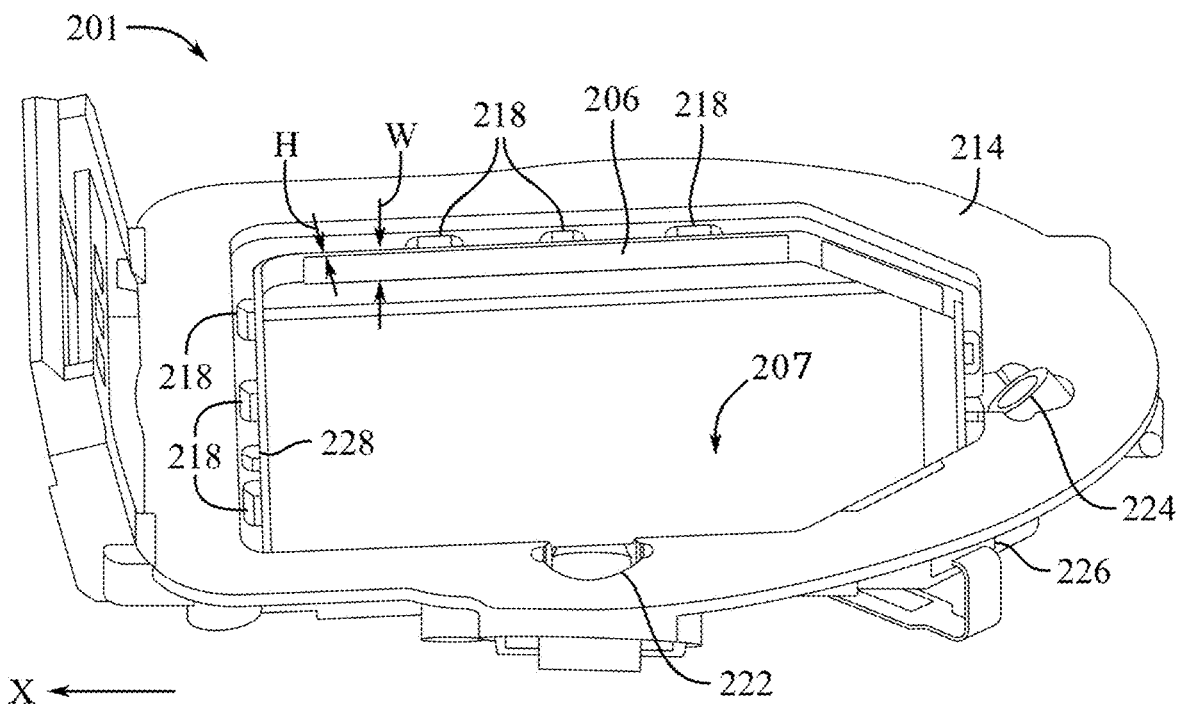
FIG. 2A illustrates a perspective view of an example of an eye-tracking assembly.
Figure 2B:
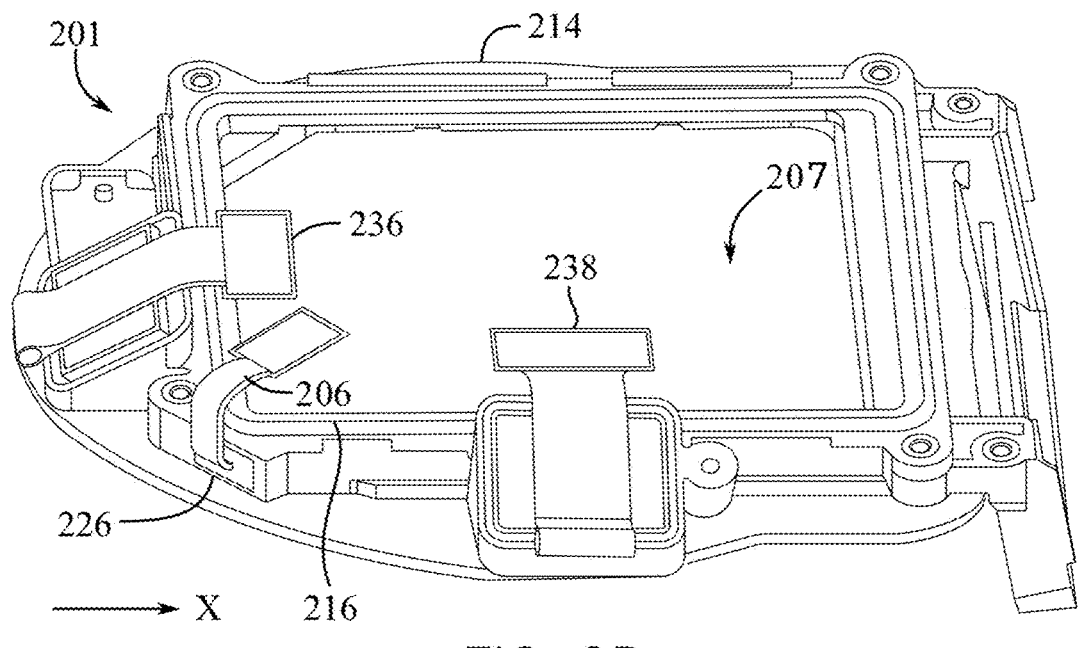
FIG. 2B illustrates another perspective view of the eye-tracking assembly.
Figure 2C:
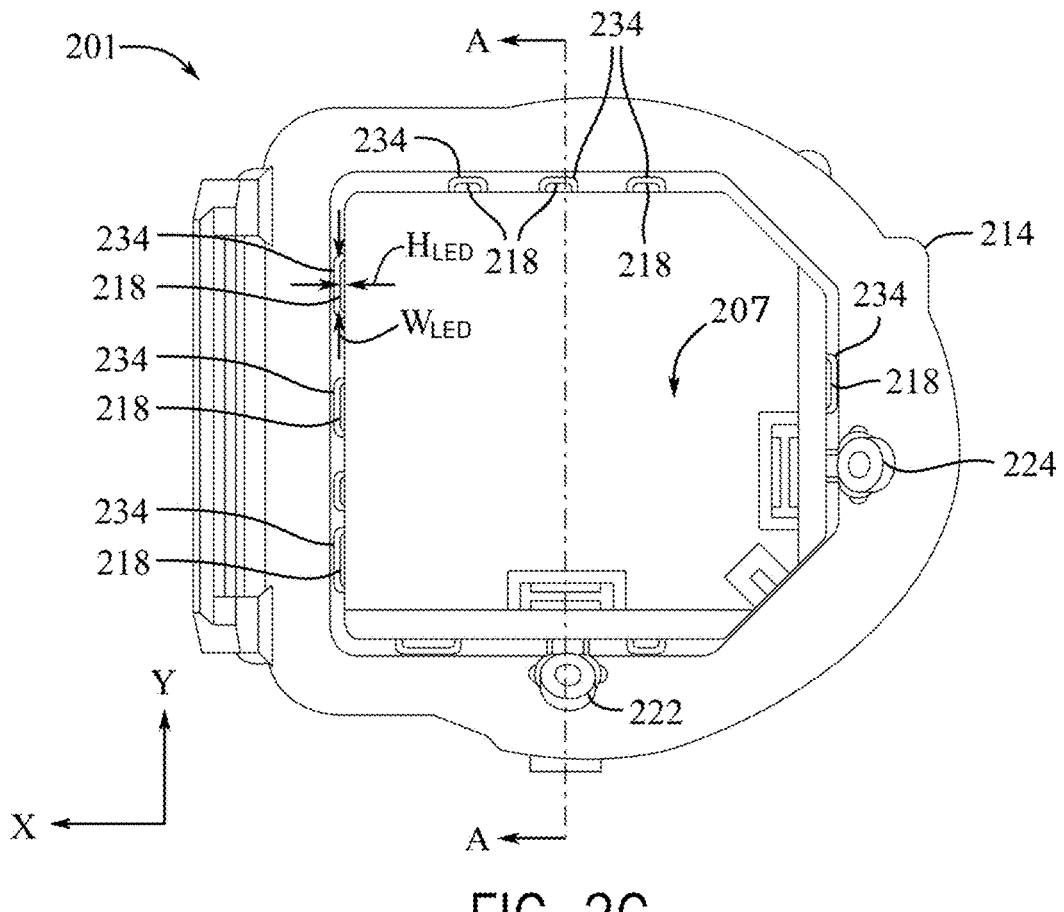
FIG. 2C illustrates a rear view of the eye-tracking assembly.
Figure 2D:
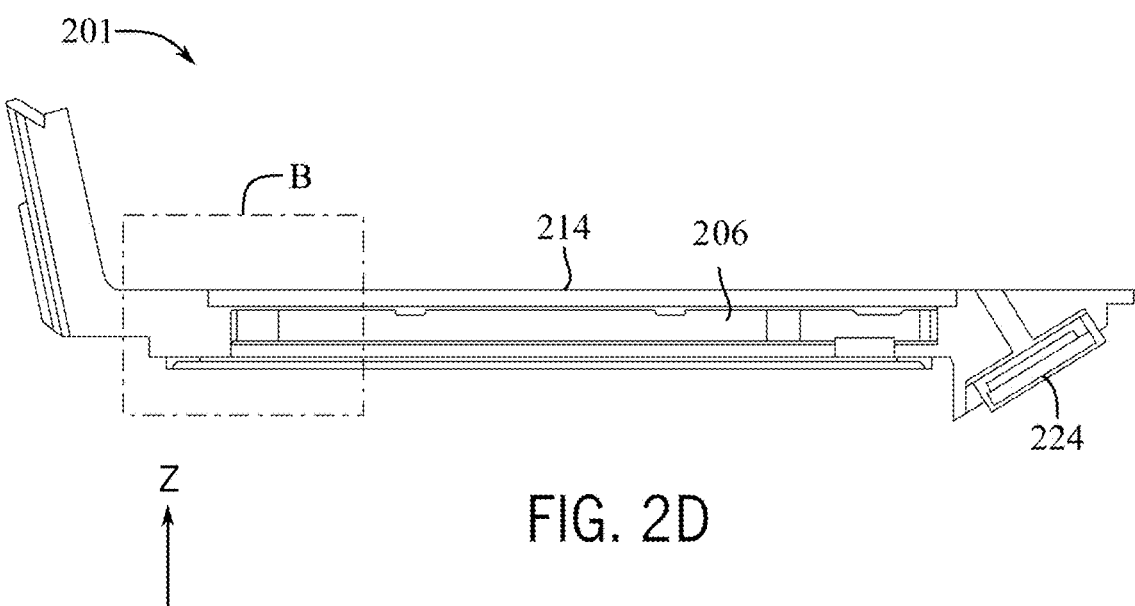
FIG. 2D illustrates a cross-sectional view of the eye-tracking assembly along the line A-A indicated in FIG. 2C.

FIG. 2A illustrates a perspective view of a portion of an eye-tracking assembly 201. In one example, the eye-tracking assembly 201 can be part of an optical module of a head-mountable electronic device, for example, the optical mod-ule 103*a* of the device 100 shown in FIG. 1A. FIG. 2B illustrates another perspective view showing a side opposite that of the eye-tracking assembly 201 shown in the perspec-tive view of FIG. 2A. FIG. 2C illustrates a rear view of the eye-tracking assembly 201. FIG. 2D illustrates a cross-sectional view of the eye-tracking assembly 201 along the line A-A indicated in FIG. 2C.

In at least one example, the eye-tracking assembly 201 can be configured to track the eye position and movement of the user's eyes and transfer related data to one or more controllers controlling the displays (e.g., displays 102*a-b* in FIG. 1A) enable the user to input information into, receive feedback from, and otherwise interact with the head-mount-able electronic device 100.

In at least one example, the eye-tracking assembly 201 can include a bezel 214 coupled to an optical module frame, for example, the optical module frame 104*a* shown in FIG. 1A, a seal 216 disposed between the bezel 214 and the optical module frame 104, a flat electrical cable 206, for example an FPC, secured to the bezel 214, and an LED array including one or more LEDs 218, and a thermistor 220. The eye-tracking assembly 201 can further include a first camera 222 and a second camera 224 secured to the optical module frame and/or the bezel 214.

As noted above, the bezel 214 can be secured to an optical module frame similar to the optical module frame 104*a* shown in FIG. 1A. In at least one example, the bezel 214 can include a structural component configured to support at least the optical module frame, the flat electrical cable 206, the array of LEDs 218, and a display similar to the displays 102*a-b* shown in FIG. 1A. The bezel 214 can include a plastic molded or casted material, or can be a molded magnesium bezel. In some examples, the bezel 214 can be painted or masked with low-reflectance near infrared (NIR) paint or other optical paint. Manufacturing of the bezel 214 using plastics and/or magnesium can allow for a lightweight eye-tracking assembly and head-mountable electronic device.

The bezel 214 can loop or partial loop configuration to define an opening 207 aligned with an optical axis of the display 102*a* in order to allow light emission from the display 102*a* through the bezel 214 to the user's eye(s). The optical axis of the display 102*a* can include an axis which is substantially orthogonal to a major plane (e.g., display plane) defined by the display 102*a*. The display plane can include the XY-plane illustrated in FIG. 2C and the optical axis can correspond to a direction indicated by the Z-axis. The opening 207 can be sized and positioned relative to the display 102a such that the bezel 214, electrical cable 206, array of LEDs 218, and other components of the eye-tracking assembly 201 can be disposed radially outward from a perimeter of the display 102a.

The seal 216 can be disposed between the bezel 214 and the optical module frame 104. The seal 216 can be a sealing material configured to prevent contaminants (such as moisture, dust, or other foreign particles) from contacting the eye-tracking assembly 201. In at least one example, the seal 216 can be disposed near or along an outer perimeter of the bezel 214. In some examples, electrical connectors 236, 238 for communication and powering various other components, such as the display 102, can be sealed between the bezel 214 and the optical module frame 104a by the seal 216.

In at least one example, the flat electrical cable 206 includes a flat, planar conductive cable that can be coupled to the bezel 214 and the optical module frame 104a. In some examples, the flat electrical cable 206 can have a width W that is greater than a height H. In at least one example, the flat electrical cable 206 can have a width W at least five times greater than the height H. In at least one example, the flat electrical cable 206 can include an FPC having a width W at least five times greater than the height H. The electrical cable 206 can be sealed between the bezel 214 and the optical module frame 104a by a seal 226. The electrical cable 206 can be installed by being fed through an opening in the bezel 214 through a liquid glue for sealing. In at least one example, the seal 226 can include glue. In one example, the seal 226 can include foam. In at least one example, the seal 226 can include silicone. In one example, the seal 226 can be formed as a plug. In one example, the seal 226 be over-molded with the bezel 214.

The electrical cable 206 can be disposed radially outward about the opening 207 and thus visually outward around a perimeter of the display 102a. Similarly, the electrical cable 206 can be disposed near or about a perimeter of the bezel 214. The electrical cable 206 can define a major plane defining the width W and oriented generally orthogonal to the display plane. As used herein, the major plane of the electrical cable 206 lies orthogonal to the X-Y plane illustrated in FIG. 2C. The electrical cable 206 can be positioned radially outward from a perimeter of the display 102a or an outer perimeter of the display 102a and can define the major plane, which is oriented non-parallel to the display plane. The width of the electrical cable 206 extends in the major plane.

As oriented and shown in the examples of FIGS. 2A-2C, the electrical cable 206 is positioned such that only the width W of the electrical cable 206, which is smaller than the height H, contributes to the visual footprint of the electrical cable 206 within the display plane (X-Y plane) as seen by the user. The major plane of the cable 206 (within the X-Z plane and/or the Y-Z plane) defined by the width is unseen by the user in the visual footprint of the cable 206 but still provides an area (e.g., surface area) on which to couple the various LEDs 218 of the eye-tracking assembly 201.

The LED array can include one or more LEDs 218. The LED array can be an illumination module including one or more infrared (IR) LEDs 218. Each LED 218 of the LED array can be electrically coupled to a surface of the flat electrical cable 206 parallel to the X-Z or Y-Z planes and can be oriented to project light parallel to the major plane of the electrical cable 206 in the Z direction. In at least one example, the LEDs 218 can include one or more side-firing LEDs to reduce the visual footprint of the LEDs 218. For example, the LEDs 218 of the LED array can have a height HLED extending outward from and orthogonal to the major plane of the flat electrical cable 206 (parallel to the display plane) less than a width WLED extending parallel to the major plane of the electrical cable 206.

Such side-firing LEDs thus have a slim profile, which reduces the visual footprint of the LEDs 218 within the X-Y plane seen by the user, while still projecting light toward the user's eyes for eye-tracking purposes. This, in combination with the position of the LEDs 218 and the electrical cable 206 radially outward from the opening 207 (and thus the display 102a) results in a minimal to negligent visual footprint as seen by the user. In this way, the eye-tracking assembly 201 does not visually interfere with the content displayed by the displays 102a-b. In some examples, each LED 218 can include a black housing. In some examples, each LED can be coupled to the electrical cable 206 via a black solder. Additional cosmetic trim pieces of the eye-tracking assembly 201 can also be masked or pained in black, as well as soldered with black solder. In some examples, black-housed and black-soldered LEDs, along with the electrical flex can be implemented as cosmetic black masking of various components. In at least one example, the black housings, solder, and masking can include low reflectance in the near infrared spectrum (NIR) and low reflectance in the visible spectrum in order to mitigate stray light from the displays 102a-b. For example, low reflectance black can include materials and geometries with less than about 5% total hemispherical reflectance (THR) for the visual spectrum and the NIR spectrum.

The light generated by the LEDs 218 can have a spectrum centered within an infrared (IR) range. In other words, the light can have a frequency spread which includes primarily IR frequencies. The LED 218 can direct IR light along the major plane (e.g., along the width of the LED 218 parallel to or generally along the Z-axis illustrated in FIG. 2D). The LEDs 218 can be configured to direct the IR light away from the display 102a. The LED 218 can be configured to direct the IR light substantially towards the user's eye. The IR light can be at least partially reflected back out of the user's eye. The reflected light can depend on factors, such as the user's eye gaze direction (angle), the user's eye contraction (index of refraction), among other factors. In some examples, the eye-tracking assembly 201 includes a thermistor 228, such as a negative temperature coefficient (NTC) thermistor, to regulate current supplied to one or more of the LEDs 218 based on temperature. For example, as LEDs are more efficient at lower temperatures, the supplied current can be decreased for user safety.

The first camera 222 and the second camera 224 can be IR-receptive cameras (also referred to as IR receivers or simply receivers). The cameras 222, 224 can be electrically coupled to the flat electrical cable or the electrical cable 206. The cameras 222, 224 can be secured to the optical module frame 104a and oriented away from the display 102a and toward the user's eye. The first camera 222 and the second camera 224 can be configured to receive reflected light from the user's eyes. The eye-tracking assembly 201 and the head-mountable electronic device 100 can include various electronic and computer components that enable eye-tracking based on parameters of reflected IR light emitted by the LEDs 218, such as angle, intensity, and so forth, of the reflected light.

Any of the features, components, and/or parts, including the arrangements and configurations thereof shown in FIGS. 2A-2D can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A-2D Additional details of the bezel and electrical flex are described below with reference to FIG. 3.

Figure 3:
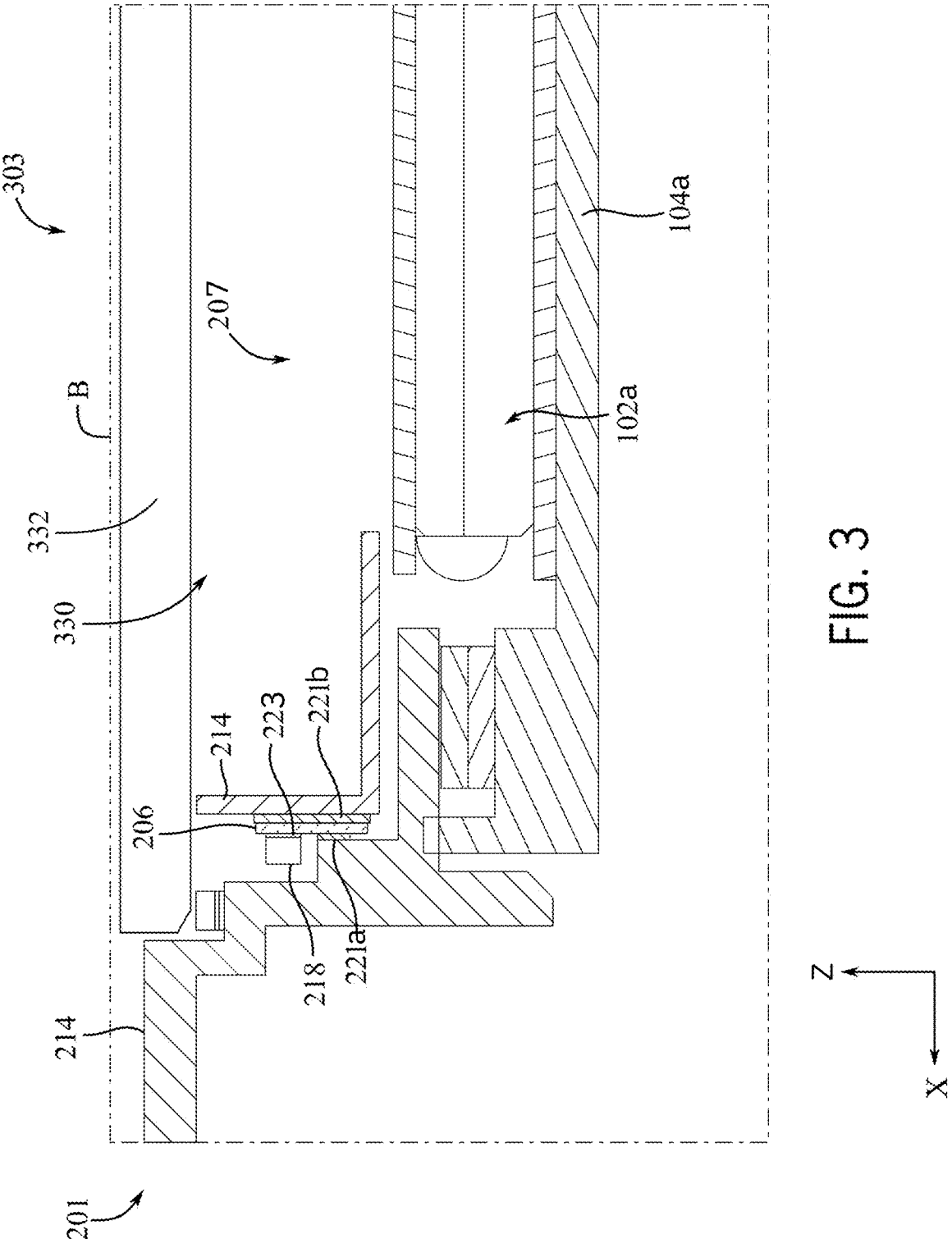
FIG. 3 illustrates a zoomed-in view in the region B of the cross-sectional view of shown in FIG. 2D of the eye-tracking assembly.

FIG. 3 illustrates a zoomed-in view in the region B indicated in the cross-sectional view of FIG. 2D of an optical module 303 including the eye-tracking assembly 201, in accordance with one or more examples of the present disclosure, a display 102a, and an optical lens 332. As illustrated, the flat electrical cable 206 can be coupled to one or more portions of the bezel 214 via adhesives 221a, 221b and disposed about a perimeter of the opening 207 and thus the display 102a projecting through the opening 207. In such an orientation, with the side-firing LED 218 coupled to the electrical cable 206 via solder 223, the side-firing LED 218 can be configured to direct IR light or IR electromagnetic radiation along the Z-axis and at least partially toward the user's eye and away from the display 102a.

The bezel 214 can be coupled to the optical module frame 104a and define a cavity 330 between the display 102 and the optical lens 332. The cavity 330 can be a void or empty space between the display 102 and a lens 332 secured to the optical module frame 104a. The electrical cable 206 can be disposed within the cavity 330 and can extend through the seal 226 (e.g., as shown in FIG. 2B). The seal 226 can be disposed between the bezel 214 and the optical module frame 204. During assembly of the optical module 303, the coupling and placement of the optical lens 332, display 102a, and optical module frame 104a can be done in a clean room to prevent or reduce dust and other contaminants from remaining within the cavity 330. In the examples of the eye-tracking assemblies described herein, including the eye-tracking assembly 201 shown in FIG. 3, the LEDs 218, electrical cable 206, and bezel 214 can be assembled together upstream from the rest of the optical module 303 and later coupled together with the optical module frame 104a and lens 332. In this way, assembly of the eye-tracking assembly 201 components, including the soldering and coupling of the electrical cable 206, LEDs 218, and bezel 214 together, can be more conveniently and cheaply assembled outside the clean room and later simply cleaned and assembled to the optical module frame 104a and lens 332 within the clean room in one step. This reduces the complexity and cost of clean room assembly and procedures.

In the above-described examples, the electrical cable 206 can be disposed about a perimeter of the display 102a. Specifically, the electrical cable 206 can be disposed along an inner perimeter of the bezel 214 such that the electrical cable 206 and the LED 218 is disposed within the cavity 330. The LED 218 can be disposed and oriented to direct IR light toward the user's eye(s) through the lens 332 in the Z-direction.

In other examples, the eye-tracking assembly 201 can include more than one flat electrical cables. The multiple electrical cables can be disposed about the perimeter of the display 102a, with gaps between each electrical cable. In such case, each electrical cable can extend through multiple respective seals, similar to the seal 226 illustrated.

In some examples, in addition to or in place of the one or more electrical cables 206, the eye-tracking assembly 201 can include one or more circuit boards electrically disposed about the perimeter of the display 102a, and LEDs 2181 can be electrically coupled to the one or more circuit boards to direct light away from the display 102a.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3. An alternative example of an eye-tracking assembly is described below in reference to FIG. 4.

Figure 4:
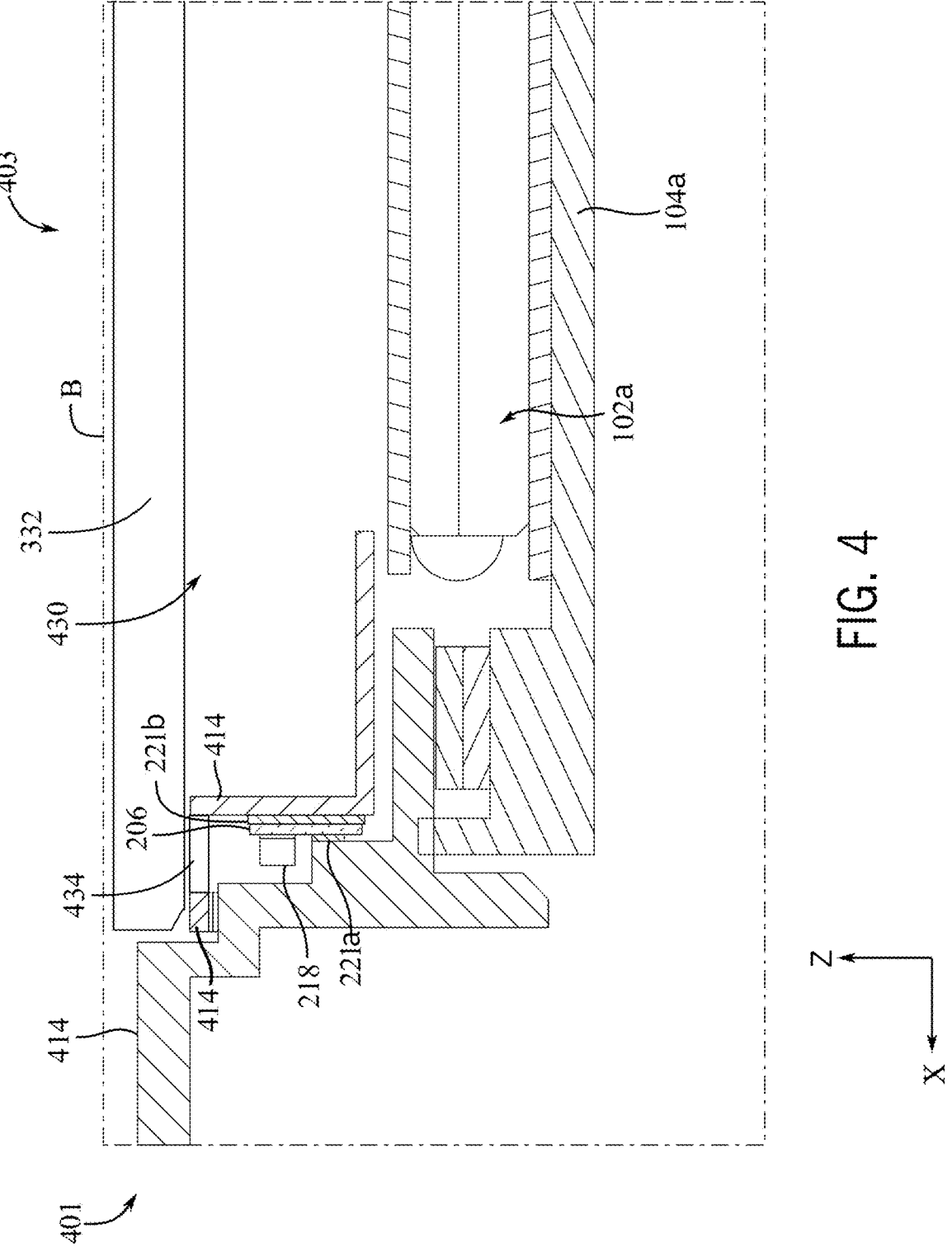
FIG. 4 illustrates a zoomed-in view of a region similar to the region B of a cross-sectional view of another example of an eye-tracking assembly.

FIG. 4 illustrates a zoomed-in view of a region similar to the region B of a cross-sectional view of an alternate example of an eye-tracking assembly 401 of an optical module 403, in accordance with one or more examples of the present disclosure. The eye-tracking assembly 401 can be substantially similar to the eye-tracking assembly 201 shown in FIG. 3, except that the electrical cable 206 and the array of LEDs 218 are disposed about an exterior perimeter of a bezel 414 such that the LED 218 and the electrical cable 206 is disposed outside the cavity 330 with the bezel 414, or at least a portion of the bezel 414, disposed between the cavity 330 and the electrical cable 206 and LED 218.

The bezel 414 and the optical module frame 104a define a cavity 430 between the display 102a and the lens 332, which is secured to the optical module frame 104a. In at least one example, the bezel 414 is disposed between the electrical cable 206 and the cavity 430. In other words, the electrical cable 206 is disposed along an outer perimeter of the bezel 414.

In at least one example, the bezel 414 can include an IR window 434. The IR window 434 can be an IR-transparent material disposed within a cutout or gap within the bezel 414. The LED 218 can be positioned to direct light, or IR radiation, through the IR window 434, through the lens 332, and to the user's eye(s), in the Z-direction.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not intended to be exhaustive or to limit the examples to the precise forms disclosed. It will be apparent to one of ordinary skill in the art that many modifications and variations are possible in view of the above teachings.

What is claimed is:

1. A head-mountable electronic device, comprising:
an optical module frame;
a display coupled to the optical module frame and extending in a display plane; and
an eye-tracking assembly, comprising:
    a flexible printed circuit (FPC) coupled to the optical module frame and disposed about a perimeter of the display, the FPC defining a major plane oriented generally orthogonal to the display plane; and
    a light emitting diode (LED) electrically coupled to the FPC along the major plane and extending orthogonal to the major plane, the LED configured to direct light away from the display.

2. The head-mountable electronic device of claim 1, wherein the FPC comprises a flat electronic cable having a height and a width at least five times greater than the height.

3. The head-mountable electronic device of claim 2, wherein the width extends in the major plane.

4. The head-mountable electronic device of claim 1, wherein the LED comprises a side-firing LED.

5. The head-mountable electronic device of claim 1, wherein the LED comprises a black housing.

6. The head-mountable electronic device of claim 5, wherein the LED is coupled to the FPC via a black solder.

7. The head-mountable electronic device of claim 1, wherein:
the head-mountable electronic device further comprises a bezel secured to the optical module frame; and
the FPC is secured to the bezel.

8. The head-mountable electronic device of claim 7, wherein:
the bezel and the optical module frame define a cavity between the display and a lens secured to the optical module frame; and
the FPC is disposed within the cavity.

9. The head-mountable electronic device of claim 7, wherein:

the bezel and the optical module frame define a cavity between the display and a lens secured to the optical module frame; and the bezel is disposed between the FPC and the cavity.

10. The head-mountable electronic device of claim 9, wherein:

the bezel includes an infrared (IR) window; and the LED is positioned to direct the light through the IR window.

11. An optical module for a wearable electronic device, comprising:

an optical module frame;

a display coupled to the optical module frame and extending in a display plane;

a bezel coupled to the optical module frame;

a seal disposed between the bezel and the optical module frame, wherein the seal is over molded with the bezel; and an eye-tracking assembly, comprising:

an FPC coupled to the bezel and positioned radially outward from a perimeter of the display, the FPC defining a major plane oriented non-parallel to the display plane; and a light emitting diode (LED) electrically coupled to the FPC.

12. The optical module of claim 11, wherein the FPC extends through the seal.

13. The optical module of claim 11, wherein the seal comprises silicone.

14. The optical module of claim 11, wherein the major plane is oriented generally orthogonal to the display plane.

15. An eye-tracking assembly for a head-mountable display device, comprising:

an FPC defining a major plane and coupled to a display assembly of the head-mountable display device, the display assembly including a display coupled to a frame; and a light emitting diode (LED) array, each LED of the LED array being electrically coupled to the FPC, extending radially outward from the display orthogonal to the major plane, and oriented to project light parallel to the major plane.

16. The eye-tracking assembly of claim 15, wherein each LED of the LED array is coupled to the FPC via black solder.

17. The eye-tracking assembly of claim 15, wherein an LED of the LED array includes a height extending orthogonal to the FPC and a width greater than the height, the width extending parallel to the major plane.

18. The eye-tracking assembly of claim 15, further comprising a camera secured to the frame and oriented away from the display.

19. The eye-tracking assembly of claim 18, wherein the camera is electrically coupled to the FPC.

\* \* \* \* \*